Patented Oct. 16, 1951

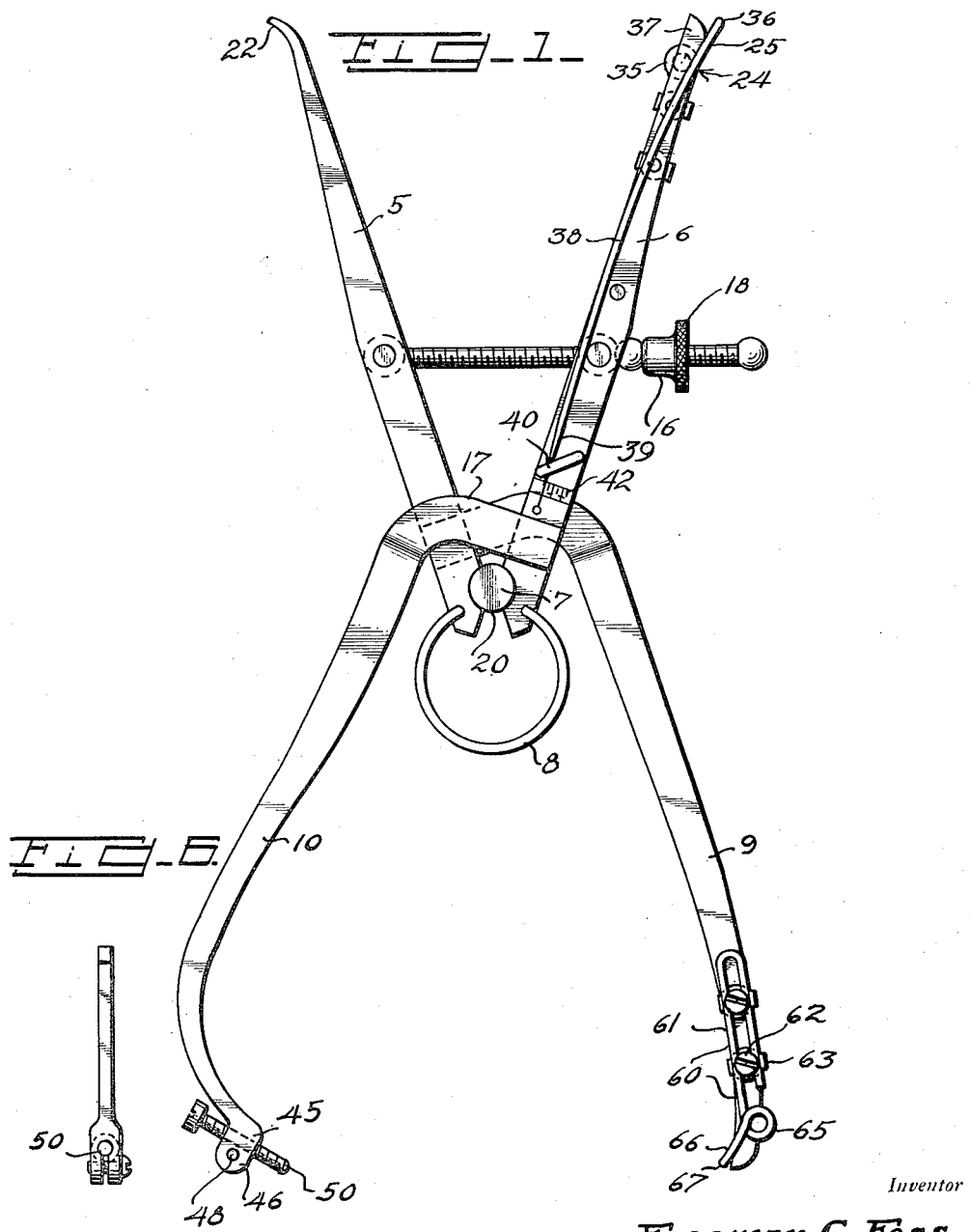

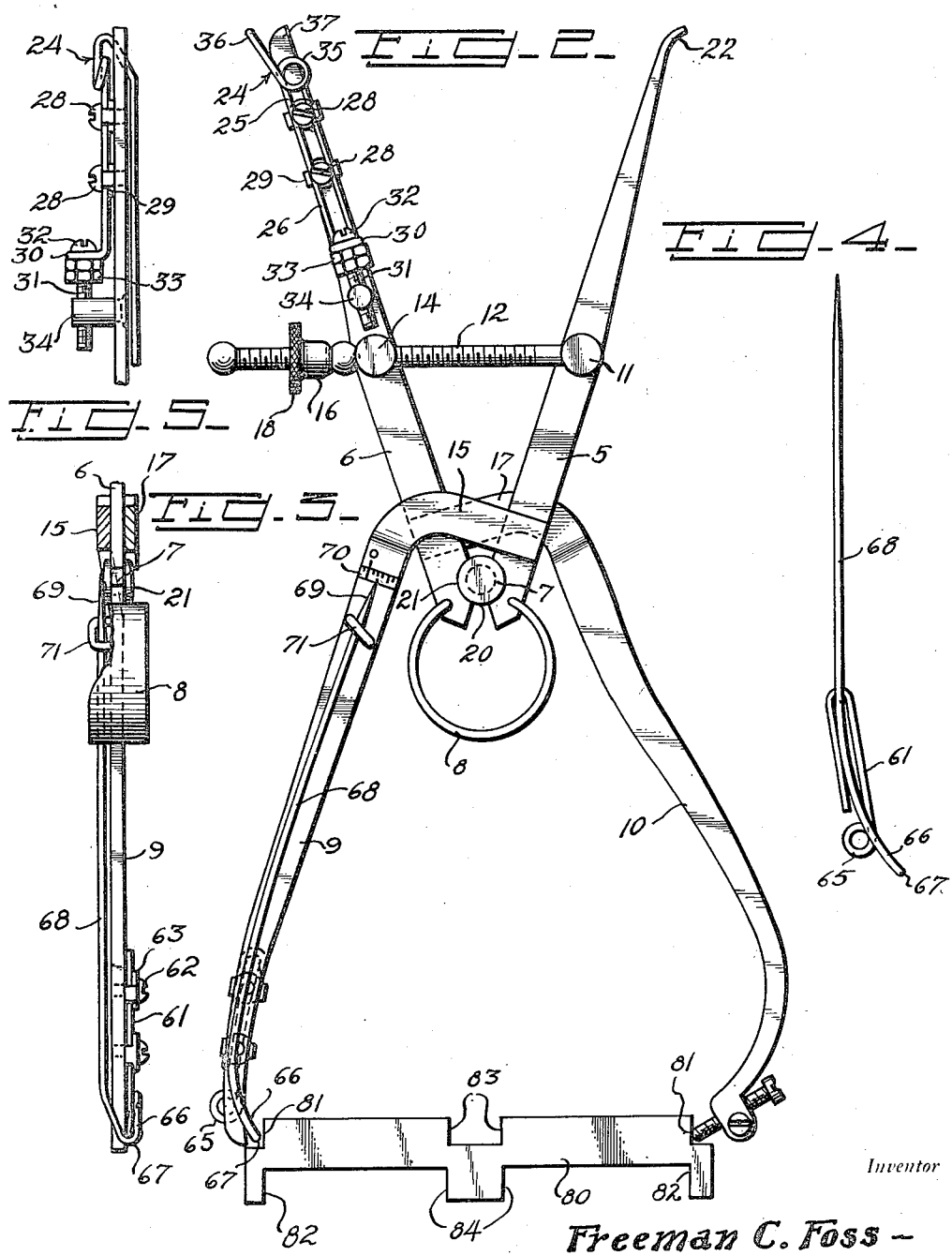

2,571,558

UNITED STATES PATENT OFFICE 2,571,558

CALIPER FOR HIGH PRECISION MEASUREMENTS

Freeman C. Foss, Twin Falls, Idaho

Application October 23, 1946, Serial No. 705,029

5 Claims. (Cl. 33—149)

This invention relates to calipers for measurements to be made with high accuracy and more particularly to calipers designed for the transfer of measurements from one object to another, and especially for the transfer of inner measurements taken on one object to outer measurements taken on another object.

The principal object of my invention consists in providing means for increasing the accuracy by eliminating all factors involving personal or individual guesses or estimates as to the existing conditions, such as the correct position of the caliper on the object necessary for "square" measurements, the extent of the deformation or displacement during the measurement which may be tolerated and like conditions.

The calipers in use are of two different kinds; one type serves to take measurements and is therefore provided with an indicator. This type of caliper is, as a rule, also provided with members associated with the legs of the caliper for operating said indicator.

A second type, however, serves merely for transferring measurements from one object to another, which other object may or may not be a measuring rod; a more specialized case is the transfer of inner measurements taken on one object, for instance a bore on said object, to the outer measurement of another object which has to fit into said bore.

The invention relates essentially to this second type of calipers.

With this type of calipers much skill is necessary to make measurements of high accuracy. If the legs, contact points, pivots, etc., are rigid and unyielding, the operator has no means to ascertain whether the measurement is "square" or has been made correctly between points at the shortest or true distance. He also has no means to ascertain the change due to the opening or closing of the calipers.

If the caliper is yielding or resilient to a certain amount, the "feel" of the operator is better but the measurement now depends on the personal estimate of the operator.

It is therefore a main object of the invention to provide separate yieldable means associated with an indicator which permit exact control of the right amount of pressure or deformation and which at the same time also indicate usually the correct position of the caliper.

Another important object consists in providing a caliper with double legs, one pair of which is equipped for inside measurement, while the other is equipped for outside measurement, which pairs are always in complete accordance or can be brought into such complete accordance, including the adjustment due to pressure, deformation and like conditions.

A further object of the invention consists in providing suitable adjustable elastic contact means on the legs whose position and deformation is directly indicated by parts of said contact devices in a simple and highly efficient manner with high precision.

Further objects and the advantages to be gained by the construction according to the invention will be apparent from the following detailed specification describing specifically one embodiment of the invention and illustrating the same in the drawings. This embodiment is merely to be considered as an example serving as a base for the explanation of the principles to be applied according to the invention; it is not to be regarded as the sole embodiment of the invention. The principles forming the invention are explained in such a way that the expert skilled in this art will be able to construct calipers embodying these principles and these need not be necessarily identical with the calipers, as illustrated and specifically described. Such further embodiments of the invention which the expert may construct are, therefore, part of the essence of the invention and are not to be considered as departures therefrom.

In the accompanying drawings:

Figure 1 is a top view of a caliper, constructed in accordance with the invention.

Figure 2 is a bottom view of the same caliper.

Figure 3 is a side view of one of the arms of the caliper.

Figures 4 to 6 are views of details.

The caliper according to the invention, although capable of being transformed into an indicating caliper, is primarily designed to take measurements of an object—whether it is an external or an internal measurement—and to transfer them to another object. As it is, for instance, repeatedly necessary to transfer an internal or inside measurement (corresponding to a bore or cavity) into an outside measurement corresponding to the cylinder, shaft, pin or the like fitting the bore or cavity, the caliper is provided with means for such a transfer.

One of the main difficulties in taking measurements with high accuracy is the personal or individual factor. With the conventional calipers the user does not "feel" the exact fitting of the caliper. He has more or less to guess the right position, pressure, etc. In many cases it is not possible to ascertain whether the measurement was "square." This term means that the calibration has been made exactly between the right points, for instance, across the shortest or true distance. Even a skilled mechanic may, therefore, very easily make mistakes impairing the accuracy of the measurement.

In order to obviate these difficulties the caliper according to the invention is provided not only with means for transforming directly inside into outside measurements and vice versa but also with means permitting to gauge the exact and square fitting of the caliper during the measurement, substituting observable indications for the personal or individual "feel" components.

The caliper according to the invention comprises two legs 5, 6 which are moving around the pivot 7 and are urged away from each other by the split ring spring 8. These legs are equipped for inside measurements as will be described below. Two further legs 9, 10 are equipped for outside measurements. These legs may form continuations of the legs 5, 6 or are connected with them rigidly by means of cross arms 15, 17 arranged approximately at right angle to the legs and connecting the legs on opposite sides of the center pivot 7 at a point remote from said center pivot. Each cross arm 15, 17 is welded or riveted to one of the legs 5, 6 respectively and passes close to the other leg to join the legs 9, 10 on the opposite side of the center pivot. The center pivot 7 on one side is thus free permitting to use the split ring spring on double calipers while the cross arms form guides for the legs and contribute to the sturdiness of the instrument. The legs 9, 10 are slightly bent near the point where they join the cross arms to permit passage of the cross arms along the legs 5, 6.

The position of the legs 5, 6 and 9, 10 with respect to each other is determined by the threaded position adjustment stem 12 which projects through the guide boss 14 mounted on leg 6 and is swively mounted on leg 5 as indicated at 11. The threaded stem 12 carries an adjustment nut 16 which is provided with a knurled portion 18.

The pivot 7 may consist of a bolt with two flat heads or end portions 20 between which the legs are fitted, each leg being provided with a cut in the form of a segment 21, pressed against the bolt by the split ring spring 8. In this way the legs may be pivotally fixed without overlapping.

At its outwardly projecting end leg 5 is provided with the usual curved finger or contact piece 22 adapted to come into contact with the surface of the object to be measured. The leg 6, however, is provided with a special contact device 24. This contact device consists of a wire 25 bent at one end, as shown in Figure 2 so as to form a hair pin loop 26 with parallel sections. This hair pin loop is fixed to the leg 6 by means of a series of small screws 28 inserted between the two parallel sections of the hair pin loop which press on the said wire sections by means of washers 29.

The end 30 of the hair pin loop 26 is moreover bent at a right angle to the leg and through this bent portion a threaded stem 31 passes, which grips the bent end of the loop by means of a head 32 and nut 33. The threaded stem then passes through an internally threaded bore in a boss 34 secured to the leg 6. It is manifest that by screwing the stem upwardly or downwardly within the boss 34, the position of the hair pin loop and of the contact finger 24 relatively to the leg may be adjusted, provided the holding screws 28 have been loosened.

Above the hair pin loop 26 the wire 25 is coiled to form a spiral winding 35. This coil spring increases the flexibility of the contact finger which, for reasons of rigidity, consists of a rather stiff wire. The end of the contact wire is freely movable. The contact wire runs towards the tip 37 of the leg, but is outwardly inclined and is then again bent around in hair pin fashion (at 36) and taking the leg astride passes to the other side of the leg 6 (see Figure 1). The bent portion 36 forming the hair pin loop forms a protruding outwardly pointing finger serving as the second contact for making measurements.

The contact wire then runs along the other side of the leg towards the pivot and forms an indicator needle 38 which is freely movable and unsupported. It is thus seen that the contact device 24 is merely supported on one side of the leg by means of hair pin loop 26 and bent end 30 while the remainder is freely movable and constitutes an indicator for the amount of pressure exerted on the contact end 36. The point 39 of the needle, as will be readily understood, is deflected over a stretch which is a multiple of the deflection of the contact finger 36, the basic ratio of multiplication being that between the distance from the contact finger 36 to the virtual pivot point and the distance from said contact to the point of the needle.

A small hoop or bail 40 arranged across the leg forms a stop for the freely movable needle 38 and prevents an excessive lateral movement of the same. A scale 42 may be arranged on leg 6 near the end of the needle to indicate the extent of needle movement.

By virtue of the coiled portion 35 the contact needle 38 begins to move on the scale when the contact point is lightly touched. A zero or middle mark on the scale indicates the correct position for the measurement. There is therefore no longer any necessity for guessing the right pressure or even the "square" measurement, as the operator after having adjusted the caliper to what he thinks is the true distance, by moving the caliper back and forth along the object for a short stretch and by observing the needle will be able to find the exact spot where the measure is "square."

An exactly similar arrangement to the one described is provided on legs 9, 10 with the sole difference, that these legs are equipped with means for taking external measurements.

Leg 10 in this case is provided with an end portion 45 consisting of two outwardly projecting clamping ears 46, 46 arranged to close a threaded split bore 47. The ears carry a screw 48 drawing them toward each other and through the threaded bore a contact screw bolt 50 passes, the end of which forms the contact for effecting the measurement. The contact screw bolt 50 may be adjusted within the threaded bore and when brought into the correct position is fixed by means of the screw 48 which tightens the grip of the split bore on the screw 50.

The second leg 9 carries the contact needle wire 60 which at one end is bent so as to form a loop section 61 of hair pin shape. Screws 62 and washers 63 are used to hold the hair pin section. In this case, no further means for adjustment are provided to illustrate an example in which the fixation of the contact wire is performed solely by the screws 62.

Again as described in connection with contact device 24 the contact wire 60 is coiled and a spiral winding 65 is provided which serves as a virtual fulcrum for the remainder of the contact wire which is freely movable. The wire 60 projects towards the tip of the leg and is bent inwardly and then by means of a sharp hair pin turn (at 67) taking the leg 9 astride, the contact point 67 is formed, which consists of the closed arcuate end of the hair pin loop 66. It will be noted that the bend at 67 is asymmetrical so as to form as sharp a bend as possible. The remainder of the contact device is formed by the contact needle 68 which runs unsupported and freely movable along the leg 9 to a pointed end 69 playing on a small scale 70 arranged transversely on the leg 9. A small loop or bail 71 limits the free movement of the needle 68.

The operation will be clear from the foregoing description. For adjustment purposes preferably a bar such as shown at 80 is used with portions 81, 82, 83, 84 having identical inside and outside measurements. The adjustment is made in the following way. First the fingers of one of the two calipers, say the inside caliper fingers 36, 22 are adjusted on the small cut 83 of the bar 80 which is for instance .500 inch wide. When the adjustment has been made so that the needle point 39 is on the mark, the outside caliper fingers 67, 50 are adjusted to bear on the projection 84. If the concordance is not perfect from the outset, the screw 50 is adjusted until needle point 69 is exactly on the mark. Now the procedure is repeated on the surfaces 81 and 82 of the bar 80 which are, for example, 5 in. apart. Measurement now starts with the outside caliper which is set on faces 81 (as shown in Figure 2) until needle point 69 is on the mark. The inside caliper fingers 22, 36 are applied against the faces 82. If measurements differ, the inside fingers have travelled too far or not far enough. By means of the screw bolt 31 the length of the finger is adjusted until the measurements coincide.

When this adjustment has been made, an inside measurement correctly made by using one pair of contact making needles or feelers, is immediately transferred to an outside measurement to be taken at the other pair of contact making needles or feelers with a high degree of accuracy.

It is manifest that the construction of many parts may differ from that described without departing from the invention.

I claim:

1. In a high precision caliper adapted for the transfer of measurements, spring pressed pivotally connected caliper legs, a threaded adjustment stem and means associated with said stem for adjusting the angular position of the caliper legs, a movable, pressure indicating contact device on one of said legs, consisting of a unilaterally supported wire bent to form an open loop, having a wire section fixed on one side of the leg, a freely movable wire section on the other side of said leg forming a contact indicating pointer, and a bent transverse section connecting the two afore-mentioned wire sections and astride of the leg, said bent transverse section forming the contact making part of the leg on which the contact device is fixed which cooperates with a rigid contact point on the other leg of the caliper for taking a measurement between the caliper legs, a deviation indicating scale on the side of the leg facing the freely movable wire section, cooperating with the pointer forming wire section, the latter indicating the contact pressure applied during measurement on the scale.

2. In a high precision caliper adapted for the transfer of measurements, spring pressed pivotally connected caliper legs, a threaded adjustment stem and means associated with said stem for adjusting the angular position of the caliper legs, a contact device on one of said legs, including a unilaterally supported wire bent to form an open loop and having a wire section fixedly held on one side of said leg, a freely movable pressure indicating wire section forming a contact indicating pointer on the other side of the leg, a bent transverse section connecting the two aforesaid wire sections, arranged astride of the leg and a coiled spiral winding between said fixed wire section and said bent transverse wire section, a deviation indicating scale on the side of the leg facing the movable wire section, cooperating with the pointer forming wire section, the bent transverse section astride of the leg forming the point contact of the leg to which the device is attached, cooperating with a rigid contact point on the other leg.

3. In a high precision caliper adapted for the transfer of measurements, spring pressed pivotally connected caliper legs, a threaded adjustment stem and means associated with said stem for adjusting the angular position of the caliper legs, a contact device on one of said legs, including a wire bent to form an open loop and comprising a fixed wire section on one side of said leg, a freely movable wire section on the other side of said leg with a free pointer forming end, arranged in substantial parallelism with the leg surface and forming an indicator, a scale on said leg surface near the free end of the freely movable wire section adapted to register the movement of the said freely movable section, a transverse bent section connecting the two aforesaid wire sections, arranged astride of the leg and forming an arch, the apex of which is located near the tip of the leg on the contact making side of the same and a coiled spiral winding between the fixed wire section and said bent transverse section, the arched portion of the latter forming the contact point of the leg to which the device is attached, cooperating with a rigid contact point on the other leg.

4. In a high precision caliper adapted for the transfer of measurements comprising a pair of spring pressed caliper legs, adapted for inside measurements, another pair of legs adapted for outside measurements, each leg of one pair being fixedly connected with one leg of the other pair, a threaded adjustment stem connecting one pair of legs and means associated with said stem for adjusting the angular position of the caliper legs, a contact device on one leg of each pair consisting of a unilaterally supported wire bent to form an open loop of hairpin shape, with two sections parallel to each other and each parallel to one of the side faces of the leg, the end portion of one of said parallel sections being fixed on the leg and the other parallel section being freely movable and forming a pointer, the said parallel wire sections being joined by a transverse section, bent to form an arch the apex of which is located near the tip of the leg on one side thereof, said arched portion forming the contact point of the leg, a deviation indicating scale on the side of the leg facing the freely movable wire section, cooperating with the end of the pointer forming freely movable section to indicate contact pressure on the contact point of the leg, the arched transverse wire section on one leg adapted for outside measurements, projecting inwardly from the tip of the leg and cooperating with an inwardly projecting rigid contact point on the second leg adapted for outside measurements, and the arched transverse bent wire section on the leg adapted for inner measurements, projecting outwardly from the tip of the leg and cooperating with an outwardly projecting rigid contact point on the second leg adapted for inner measurements.

5. A high precision caliper, as claimed in claim 2, in which the fixed wire section has the shape of a hair pin located in a plane parallel to the leg surface, and clamping means including a screw bolt passing through said leg for adjustably holding said hair pin shaped fixed wire section on the leg and for adjusting the position of the contact device with respect to the tip of the leg.

FREEMAN C. FOSS.

REFERENCES CITED

The following references are of record in the file of this patent:

UNITED STATES PATENTS

| Number | Name | Date |
| --- | --- | --- |
| 57,588 | Soper | Aug. 28, 1866 |
| 345,978 | Lombard | July 20, 1886 |
| 380,836 | Warfield | Apr. 10, 1888 |
| 454,569 | Dyson | June 23, 1891 |
| 794,094 | Glover | July 4, 1905 |
| 835,466 | Prario | Nov. 6, 1906 |
| 1,304,017 | Brock et al. | May 20, 1919 |
| 1,324,870 | Zito | Dec. 16, 1919 |
| 1,435,630 | Cichy et al. | Nov. 14, 1922 |
| 1,672,966 | Wahlberg | June 12, 1928 |
| 2,216,916 | Jones | Oct. 8, 1940 |
| 2,357,836 | McGreevy | Sept. 12, 1943 |

FOREIGN PATENTS

| Number | Country | Date |
| --- | --- | --- |
| 552,031 | Great Britain | Mar. 19, 1943 |